Patented Jan. 15, 1935

1,987,750

UNITED STATES PATENT OFFICE 1,987,750

PROCESS FOR PRODUCING SYNTHETIC CAMPHOR

John J. Ritter, Yonkers, N. Y.

No Drawing. Application August 3, 1933,
Serial 683,547

9 Claims. (Cl. 260—133)

This invention relates to a process for producing synthetic camphor.

An object of the invention is the provision of a process for producing synthetic camphor from bornyl chloride, in which the bornyl chloride is treated with aniline in the presence of an initial quantity of camphene to produce isobornylaniline.

Another object of the invention is the provision of a process for producing synthetic camphor, in which isobornylaniline is first produced and then dehydrogenated, thereby producing camphor anil, steps being taken to obtain the pure anil which is then hydrolyzed to camphor and aniline.

Another object of the invention is the provision of a process for producing synthetic camphor, in which isobornylaniline is first produced and then mixed with sulfur and heated to cause dehydrogenation of the isobornylaniline with the discharge of hydrogen sulfide, thereby producing camphor anil, steps being taken to obtain the pure anil which is then hydrolyzed to camphor and aniline.

A still further object of the invention is to provide a process for the production of synthetic camphor by the use of nickel as a catalyst to effect the dehydrogenation of isobornylaniline, thereby producing camphor anil which is then hydrolyzed to camphor and aniline.

This invention will be best understood from a consideration of the following detailed description forming a part of the specification; nevertheless, it is to be understood that the invention is not confined to the disclosure, being susceptible of such changes and modifications which shall define no material departure from the salient features of the invention as expressed in the appended claims.

It has been known that the treatment of bornyl chloride with aniline yields some isobornylaniline, together with camphene and aniline hydrochloride. This reaction is of no economic importance because the yield of isobornylaniline is low, and also because of the fact that isobornylaniline has not been shown heretofore as being capable of conversion to camphor in any simple manner. It is also known that treatment of camphene with a mixture of aniline and aniline hydrochloride produces some isobornylaniline, but the yields of isobornylaniline are likewise low in this reaction. It has further been known that the action of aniline hydrochloride on isobornylaniline in the presence of aniline at elevated temperatures decomposes the isobornylaniline, yielding aniline and camphene.

I have now found that mixtures of aniline, camphene, aniline hydrochloride, and isobornylaniline come to equilibrium, the equilibrium concentrations depending, at a given temperature, upon the initial concentrations of each. Therefore, bornyl chloride treated with a mixture of camphene, aniline, and aniline hydrochloride in which the concentrations of the latter are so chosen to be in equilibrium, at the end of the reaction, with a concentration of isobornylaniline equivalent to the bornyl chloride used, will come to equilibrium in which one equivalent of isobornylaniline is produced from each equivalent of bornyl chloride, i. e., the yield is 100%. In practice, this comprises treatment of bornyl chloride with aniline in the presence of an initial quantity of camphene. After the reaction is complete, camphene equal in amount to that initially added may be recovered and reused indefinitely. It is evident, from the foregoing, that high yields of isobornylaniline may be obtained by equilibrating mixtures of the reactants in various proportions; the examples to be given presently have been selected from a number of equally effective mixtures in different proportions.

A typical procedure for carrying out the process will now be described: 111.8 parts by weight of bornyl chloride, 47.6 parts by weight of camphene, 45.4 parts by weight of aniline hydrochloride, and 339.4 parts by weight of aniline are mixed and boiled for seven hours. The reaction mixture is then allowed to cool, and neutralized by adding an excess of an alkali, such as sodium hydroxide. An oily layer consisting of aniline, camphene, and isobornylaniline separates out. The aniline and camphene are separated from the isobornylaniline in any suitable manner, as by steam distillation, since isobornylaniline is very slightly volatile with steam. The oily layer may also be dried and distilled at ordinary pressure or in vacuo to remove the camphene and aniline. Distillation up to 130° C. at the pressure of 1 millimeter of mercury removes 47.6 parts by weight of camphene and 279 parts by weight of aniline. The remaining distillate consists entirely of isobornylaniline which boils at 131° C. at the pressure given above, and 148.8 parts by weight of isobornylaniline are obtained. The recovered camphene and aniline may be reused indefinitely, for the production of further quantities of isobornylaniline.

A slightly modified form of the process will be described: 279 parts by weight of aniline, 76 parts by weight of camphene, and 76 parts by weight of bornyl chloride are mixed and boiled for seven hours. The reaction mixture is then allowed to cool somewhat, and neutralized by washing with an excess of an alkali, such as sodium hydroxide. An oil is obtained, which on distillation as described in the previous example yields 238 parts by weight of aniline, 76 parts by weight of camphene, and 100 parts by weight of isobornylaniline. To the recovered aniline (238 parts by weight) and camphene (76 parts by weight) are now added 76 parts by weight of bornyl chloride and 41 parts by weight of aniline for the production of a further 100 parts by weight of isobornylaniline.

Two methods for the production of isobornylaniline have been described, and it is immaterial which method is used for the next step of the process, which is the production of camphor anil. In this step, 100 parts by weight of isobornylaniline is mixed with 14 parts by weight of sulfur, and the mixture heated at temperatures ranging from 190° C. to 300° C. approximately, to effect dehydrogenation of the isobornylaniline. This may be accomplished, for example, by heating at 215–220° C. for two hours, and then raising the temperature to 230–235° C., where the heating is continued for an additional two hours. The camphor anil is now separated from the crude reaction mixture by distillation or other convenient means. Distillation at the pressure of 1 mm. of mercury yields 75 parts by weight of camphor anil boiling at 118–120° C., and 15 parts by weight of unchanged isobornylaniline.

The camphor anil is now hydrolyzed to camphor and aniline. This may be accomplished by any customary method of hydrolysis. One such method is as follows: The camphor anil is added to a slight excess of mineral acid, such as sulfuric acid, in approximately 25% aqueous solution, and heated at 90–100° C. for one-half hour. The camphor is then isolated in any well known manner.

I have previously explained how isobornylaniline may be dehydrogenated with sulfur, and will now describe a further process in which the dehydrogenation is accomplished by the action of a metal catalyst such as nickel: 100 parts by weight of isobornylaniline, 2 parts by weight of sodium hydroxide, and 10 parts by weight of nickel (obtained in an active form by reduction of the oxide with hydrogen at 300–310° C., or in any other well known manner) are heated at a temperature around 340° C. for two hours, during which hydrogen is steadily evolved. The partially dehydrogenated product of this treatment is then distilled to separate the camphor anil formed.

Another procedure for the dehydrogenation of isobornylaniline involves the use of such oxidizing agents as chromic acid, permanganate, and oxygen. One procedure of this type will be outlined: isobornylaniline is heated to approximately 100–150° C., and oxygen led into the liquid for a period of four hours. The product of this treatment is then heated for a short time with an aqueous solution of an acid, as sulfuric acid, and camphor is thereby produced and may be isolated in any convenient manner.

It is to be noted that it is not the intent, in this specification, to limit the process described to the particular reagents and conditions set forth in the above examples. These examples have been given to elucidate typical working procedures. In particular, it should be noted that other bornyl halides, as the bromide, may be used in place of bornyl chloride; and other aromatic amines, as the toluidines, may be substituted for aniline, yielding the corresponding N-monoisobornyl derivatives of the aromatic amines, which on dehydrogenation yield the corresponding N-aryl camphor imines.

It has been found also that treatment of alpha-pinene with a mixture of aniline and aniline hydrochloride results in the formation of isobornylaniline which may be dehydrogenated to camphor anil in the same manner as the isobornylaniline obtained by the above-described methods. In general, the process contemplates the production of camphor by treatment of substances capable of yielding camphene by interaction with a mixture of an aromatic amine and an aromatic amine hydrohalide with that mixture in the presence of an initial quantity of camphene to produce the N-isobornyl derivative of the aromatic amine, dehydrogenation of said N-isobornyl derivative of the aromatic amine to yield the corresponding N-aryl camphor imine, and hydrolysis of the latter to form camphor and the corresponding aromatic amine.

The formulæ is indicative of the course of reactions in carrying out my process:

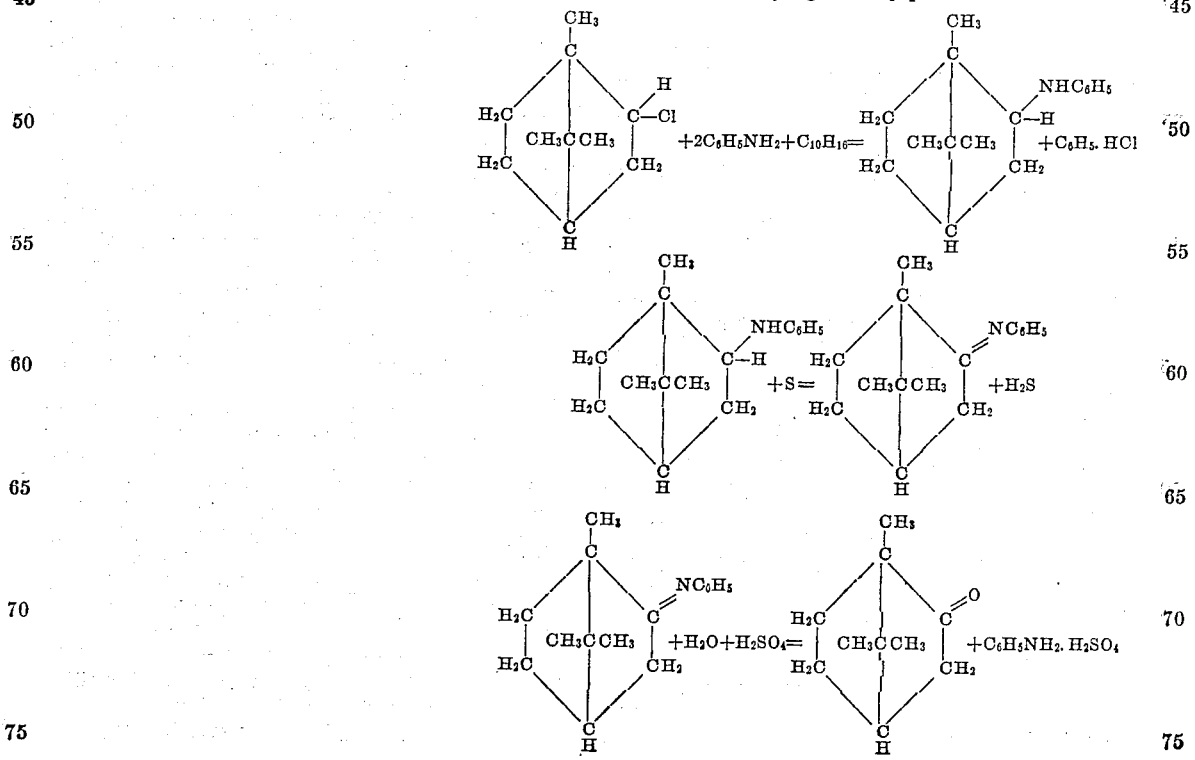

I claim:

1. The process of producing synthetic camphor which comprises treating bornyl chloride with aniline in the presence of aniline hydrochloride and an initial quantity of camphene to form isobornylaniline, then heating a mixture of the isobornylaniline and sulfur to form camphor anil, then treating the last-named compound with a water solution of an acid to form camphor and then removing the camphor.

2. The step in the process for the production of synthetic camphor which comprises treating bornyl chloride with aniline in the presence of an initial quantity of camphene to produce isobornylaniline.

3. The step in the process for the production of synthetic camphor which comprises treating a bornyl halide with an aromatic amine in the presence of an initial quantity of camphene to produce the corresponding N-monoisobornyl derivative of the aromatic amine.

4. The step in the process for the production of synthetic camphor which comprises treating alpha-pinene with a mixture of aniline and aniline hydrochloride to produce isobornyl aniline.

5. The step in the process for the production of synthetic camphor which comprises treating substances capable of yielding camphene on treatment with a mixture of an aromatic amine and an aromatic amine hydrohalide with that mixture in the present of an initial quantity of camphene to produce the corresponding N-monoisobornyl derivative of the aromatic amine.

6. The step in the process for the production of synthetic camphor which comprises treating isobornylaniline with sulfur, thereby dehydrogenating the isobornylaniline with the discharge of hydrogen sulfide and forming camphor anil.

7. The step in the process for the production of synthetic camphor which comprises treating isobornylaniline with a nickel catalyst, thereby dehydrogenating the isobornylaniline with the discharge of hydrogen and forming camphor anil.

8. The step in the process for the production of synthetic camphor which comprises treating the N-monoisobornyl derivative of an aromatic amine with a nickel catalyst, thereby dehydrogenating the N-monoisobornyl derivative of the aromatic amine to the corresponding N-aryl camphor imine.

9. The process for producing synthetic camphor comprising treating substances capable of yielding camphene on treatment with a mixture of an aromatic amine and aromatic amine hydrohalide with that mixture to produce the corresponding N-monoisobornyl derivative of the aromatic amine, then dehydrogenating the latter to yield the corresponding N-aryl camphor imine, and hydrolyzing N-aryl camphor imine to yield camphor and the aromatic amine.

JOHN J. RITTER.